(12) United States Patent
Hoetzeldt

(10) Patent No.: US 9,764,845 B2
(45) Date of Patent: Sep. 19, 2017

(54) MODULE FOR SEALING AN INTERFACE INSIDE AN AIRCRAFT

(71) Applicant: Airbus Operations GmbH, Hamburg (DE)

(72) Inventor: Stephan Hoetzeldt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 232 days.

(21) Appl. No.: 14/670,015

(22) Filed: Mar. 26, 2015

(65) Prior Publication Data

US 2015/0274305 A1    Oct. 1, 2015

(30) Foreign Application Priority Data

Mar. 27, 2014    (EP) .................................... 14162052

(51) Int. Cl.
| | |
|---|---|
| *B64D 13/02* | (2006.01) |
| *B64D 45/00* | (2006.01) |
| *F16J 15/04* | (2006.01) |

(52) U.S. Cl.
CPC ............ *B64D 13/02* (2013.01); *B64D 45/00* (2013.01); *F16J 15/04* (2013.01)

(58) Field of Classification Search
CPC .......... B64D 13/02; B64D 45/00; F16J 15/04
See application file for complete search history.

(56) References Cited

U.S. PATENT DOCUMENTS

| | | | | |
|---|---|---|---|---|
| 3,096,601 A | * | 7/1963 | Henry-Biabaud | .. B60R 13/0206 296/39.1 |
| 3,338,284 A | * | 8/1967 | Ausnit | ............... B65D 33/2541 24/585.12 |
| 3,832,820 A | * | 9/1974 | Eggert | .................. F16B 5/0607 52/309.1 |
| 3,980,196 A | * | 9/1976 | Paulyson | ............. B65D 90/047 220/1.5 |
| 4,171,064 A | * | 10/1979 | Friess | .................... B65D 5/061 229/186 |
| 5,007,473 A | * | 4/1991 | Evensen | ................. A47F 5/105 160/135 |

(Continued)

FOREIGN PATENT DOCUMENTS

| | | |
|---|---|---|
| EP | 0784141 | 7/1997 |
| EP | 2410189 | 1/2012 |

(Continued)

OTHER PUBLICATIONS

European Search Report, Sep. 1, 2014.

*Primary Examiner* — Valentina Xavier
(74) *Attorney, Agent, or Firm* — Greer, Burns & Crain, Ltd.

(57) ABSTRACT

A module for sealing an interface between compartments of a pressurized cabin of an aircraft. The module comprises a frame, a sheet and a rigid structure. The frame includes an opening surrounded by attachment surfaces. The frame is connected or connectable to a support structure of the aircraft. The sheet is attached to the attachment surfaces of the frame for sealing the at least one opening. The rigid structure is attached to the sheet within the frame without contacting the frame so that a displacement of the rigid structure relative to the frame induces tensile stress in the sheet between the frame and the rigid structure.

13 Claims, 7 Drawing Sheets

(56) References Cited

U.S. PATENT DOCUMENTS

| | | | | |
|---|---|---|---|---|
| 5,394,666 A * | 3/1995 | Zahner, III | ............... | E04D 3/30 |
| | | | | 52/302.1 |
| 5,555,681 A * | 9/1996 | Cawthon | ............... | A01G 9/16 |
| | | | | 135/119 |
| 5,803,524 A * | 9/1998 | McCammon | ........... | B60R 13/01 |
| | | | | 296/39.1 |
| 5,884,900 A * | 3/1999 | Gobeil | ............... | B25C 11/00 |
| | | | | 254/21 |
| 6,070,365 A | 6/2000 | Leonard | | |
| 6,123,321 A * | 9/2000 | Miller | ............... | A47D 13/065 |
| | | | | 160/135 |
| 6,196,607 B1 * | 3/2001 | Gulisano | ............... | B60R 13/01 |
| | | | | 293/115 |
| 6,199,798 B1 * | 3/2001 | Stephan | ............... | B64C 1/14 |
| | | | | 244/119 |
| 7,350,772 B2 * | 4/2008 | Legrand | ............... | A47D 13/065 |
| | | | | 160/135 |
| 7,789,193 B2 * | 9/2010 | Suzuki | ............... | E01F 8/0023 |
| | | | | 181/210 |
| 8,083,023 B1 * | 12/2011 | Perdue et al. | ........ | E04B 1/8218 |
| | | | | 181/198 |
| 8,707,648 B2 * | 4/2014 | Timko | ............... | F16B 5/065 |
| | | | | 52/476 |
| 2004/0188563 A1 * | 9/2004 | Guard | ............... | F16B 5/0064 |
| | | | | 244/118.1 |
| 2005/0103786 A1 | 5/2005 | Eijkelenberg et al. | | |
| 2006/0249642 A1 * | 11/2006 | Mavis | ............... | A47B 91/005 |
| | | | | 248/346.3 |
| 2008/0066393 A1 * | 3/2008 | Sorensen | ............... | A63H 33/101 |
| | | | | 52/81.1 |
| 2008/0083376 A1 * | 4/2008 | Hurwitz | ............... | A01K 1/0125 |
| | | | | 119/167 |
| 2010/0224728 A1 * | 9/2010 | Feiler | ............... | B64C 1/066 |
| | | | | 244/119 |
| 2013/0000225 A1 * | 1/2013 | D'Ancona | ............... | A47C 31/002 |
| | | | | 52/167.1 |
| 2013/0087656 A1 * | 4/2013 | Hoetzeldt | ............... | B64C 1/066 |
| | | | | 244/119 |
| 2013/0092588 A1 * | 4/2013 | Aksan | ............... | B65D 81/261 |
| | | | | 206/503 |
| 2014/0318721 A1 * | 10/2014 | Pedersen | ............... | E06B 9/0638 |
| | | | | 160/210 |

FOREIGN PATENT DOCUMENTS

| | | |
|---|---|---|
| GB | 2100345 | 12/1982 |
| WO | 9936970 | 7/1999 |
| WO | 2011131290 | 10/2011 |

* cited by examiner

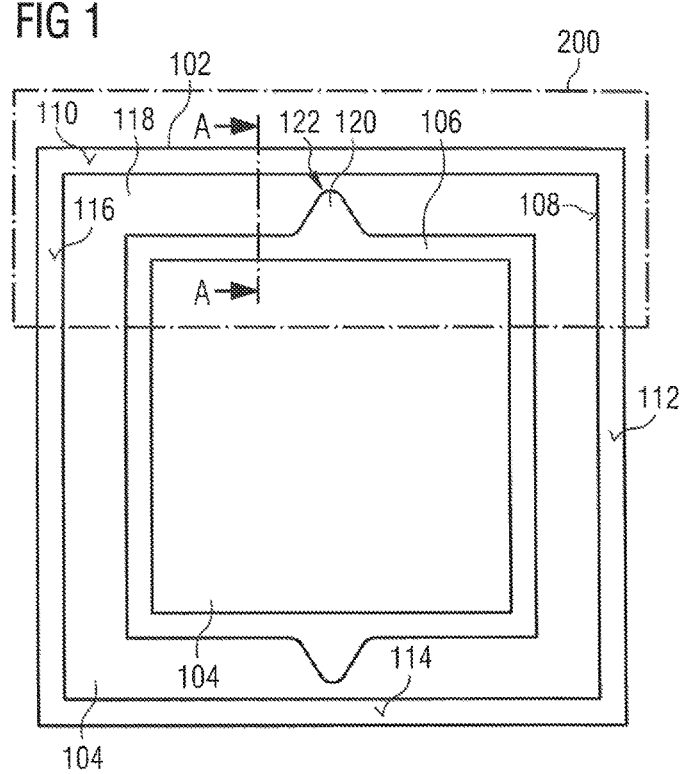
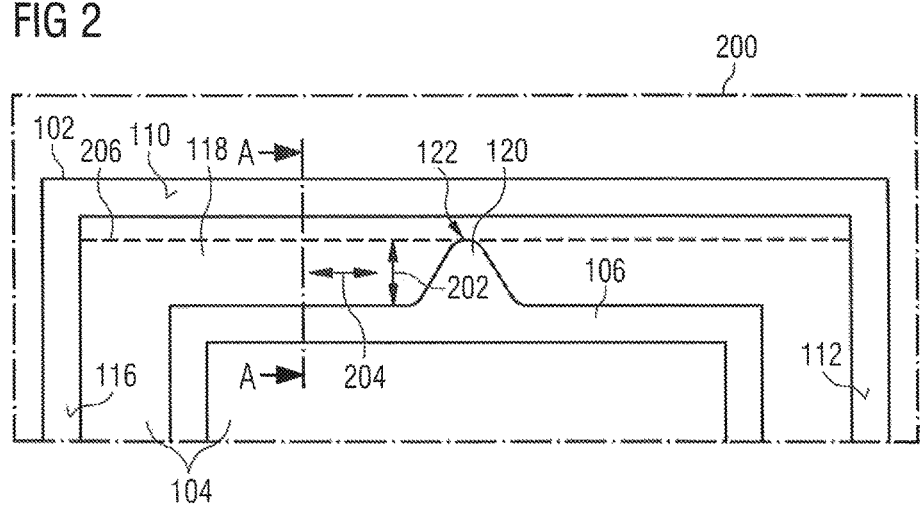

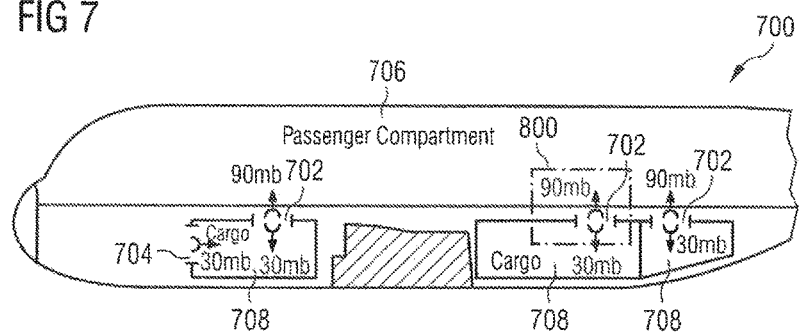
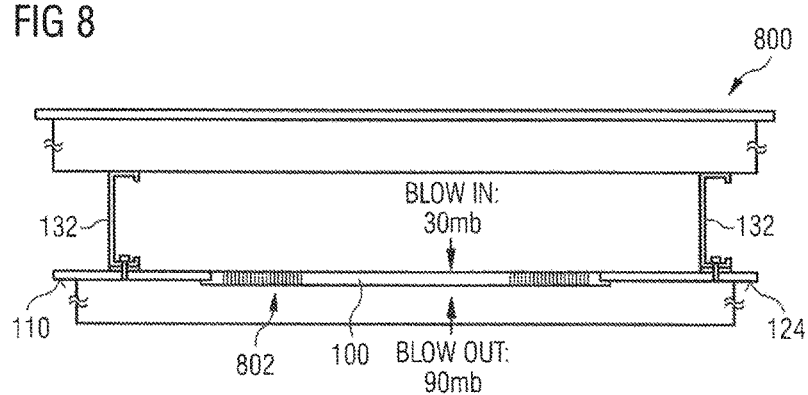

MODULE FOR SEALING AN INTERFACE INSIDE AN AIRCRAFT

CROSS-REFERENCES TO RELATED APPLICATIONS

This application claims the benefit of the European patent application No. 14162052.6 filed on Mar. 27, 2015, the entire disclosures of which are incorporated herein by way of reference.

BACKGROUND OF THE INVENTION

The present disclosure relates to a module for sealing an interface between compartments of a pressurized cabin of an aircraft. More specifically, and without limitation, the present disclosure relates to a module that maintains a gas-tight separation between the compartments up to a predefined differential pressure between the compartments.

The ambient atmospheric pressure for an aircraft considerably varies as a function of flight altitude. At an altitude of around 5,500 m (about 18,000 ft.), the ambient pressure has dropped to approximately half of the atmospheric pressure at sea level. On a typical cruising altitude of 12,000 m (about 40,000 ft.), the ambient pressure drops to less than a fifth of sea level pressure. Therefore, passenger aircraft and many transport aircraft have a pressurized cabin, in which an internal pressure is maintained during flight at a pressure level comparable to the atmospheric pressure at an altitude of, e.g., 2,400 m (about 8,000 ft.). The internal pressure can be maintained by means of air compressors, bleed air from a compressor stage of an engine and ram air inlets.

The pressurized cabin is subdivided into compartments, such as a cockpit, a passenger cabin, a crew rest compartment (CRC) and one or more cargo compartments. In the event of a pressure drop in one of the compartments, e.g., due to damage of the pressurized cabin or a failure of an outlet valve, a pressure difference acts inside the aircraft at compartment interfaces. The non-uniform pressure distribution inside the aircraft causes additional forces, for which a primary structure of the aircraft is not optimized, and may even lead to damage of the primary structure. In order to avoid the potentially serious consequences of such damage, the internal pressure difference is compensated by ventilating air between affected and unaffected compartments in the event of rapid decompression.

Document EP 0 784 141 A1 describes a decompression locking device for releasing a flap from a closed position in the event of decompression. The flap is locked by means of a bolt. A detent spring keeps the bolt in a closed position and releases the bolt, when a differential pressure acts on the flap. Such conventional locking devices are also referred to as differential flap system. Due to the complex mechanism necessary for a plurality of locking devices, the differential flap system is heavy and costly.

Document EP 2 410 189 A1 describes a decompression fastening device for connecting a lining panel to a supporting structure so that the connection opens upon exceeding a differential pressure acting on the lining panel. The fastening device includes a retaining bolt with a bolt head for retaining the panel and a form-locking head with recesses for receives leave-spring arms in the connected position. When a certain pressure accumulates on one side of the lining panel, the connection is released and the retaining bolt is axially pushed out of the leave-spring arms. Such conventional fastening devices are also referred to as an integral collapsing system. The integral collapsing system only allows releasing the connection in a blow-in direction. Furthermore, neighboring lining panels have to overlap (which is also referred to as a sandwich-lining) in order to form a gas-tight separation in the connected position, which adds the weight of the integral collapsing system. The integral collapsing system is not compatible with zippers for an air-tight connection between neighboring lining panels.

Document WO 2011/131290 A2 describes an aircraft interior equipment component comprising a frame. The frame includes two rigid frame sections and a joint connecting the rigid frame sections to one another. The frame supports a sheet-like section. When a differential pressure acts on the aircraft interior equipment component, the aircraft interior equipment component becomes detached from a coupling pin.

SUMMARY OF THE INVENTION

Accordingly, there is a need for a technique that allows maintaining a gas-tight separation between compartments of an aircraft and that provides a rapid decompression functionality for both blow-in and blow-out events.

According to one aspect, a module for sealing an interface between compartments of a pressurized cabin of an aircraft is provided. The module comprises a frame providing at least one opening surrounded by attachment surfaces, the frame being connected or connectable to a supporting structure of the aircraft; a sheet attached to the attachment surfaces of the frame for sealing the at least one opening; and a rigid structure attached to the sheet within the frame without contacting the frame so that a displacement of the rigid structure relative to the frame induces tensile stress in the sheet between the frame and the rigid structure.

Due to the tensile stress induced in the sheet between the frame and the rigid structure, the sheet can rupture, when a pressure difference between the compartments acts on the module and exceeds a critical value. A displacement of the rigid structure in any direction, e.g., perpendicular to the sheet, may induce the tensile stress in the sheet. The rigid structure may essentially exclude tensile stress in those areas of the sheet to which the rigid structure is attached or within a convex hull of those areas of the sheet to which the rigid structure. The tensile stress may be focused on, or limited to, an area between the rigid structure and the attachment surfaces of the frame, e.g., in a vicinity of the rigid structure.

The sheet may maintain a gas-tight separation between the compartments up to a critical differential pressure between the compartments. The sheet and the attachment surfaces may be joined together in a gas-tight manner. The area at which the sheet is attached to the frame may surround the opening. The area at which the sheet is attached to the frame may include a closed curve surrounding the opening. The sheet may be attached to the entire area of the attachment surfaces.

The induced tensile stress may cause the rupture of the sheet in the area between the rigid structure and the attachment surfaces of the frame. The sheet may rupture parallel to one of the attachment surfaces. A rupture mechanism may include a fracture or crack propagating in the sheet. The rupture mechanism may include a crack propagating parallel to one of the attachment surfaces. The crack propagation may be terminated at another one of the attachment surfaces. The crack may propagate at the speed of sound of the sheet. The induced tensile stress may cause the rupture of the sheet according to an opening mode fracture.

By virtue of a reproducible rupture mechanism, pressure equalization between the compartments can occur when the differential pressure exceeds a predefined critical differential pressure. The critical differential pressure may be defined by at least one of a geometry of the frame, a size of the frame, a distance between the attachment surfaces and the rigid structure (e.g., a minimum distance therebetween), a shape of the rigid structure (e.g., a shape of the areas at which the rigid structure contacts the sheet) and material properties of the sheet (e.g., an ultimate tensile strength thereof).

The rigid structure may include at least one protrusion, each of which protrudes towards one of the attachment surfaces of the frame without contacting the frame. The protrusion may also be referred to as an arm or a finger extending from the rigid structure. The sheet may be also attached to the at least one protrusion.

Each of the at least one protrusion may define a minimum distance between the rigid structure and the attachment surface towards which it protrudes. Each of the protrusions may define a local minimum distance between the rigid structure and the attachment surfaces. An ultimate tensile strength of the rigid structure may be greater than the ultimate tensile strength of the sheet. The composite of sheet and rigid structure may exhibit a discontinuity in the ultimate tensile strength, e.g., at an end portion of the protrusion defining the minimum distance between the rigid structure and the attachment surface.

The protrusion may have a lateral dimension in a direction towards the frame. The lateral dimension may extend from the rigid structure to the end portion of the protrusion facing the frame. The lateral dimension may be equal to or greater than the minimum distance, preferably at least twice the minimum distance.

An elastic modulus of the rigid structure may be greater than an elastic modulus of the sheet. The displacement of the rigid structure relative to the frame may induce the tensile stress in the sheet at the end portion of the protrusion facing the frame. A difference in elasticity of the rigid structure and the sheet may cause a local peak of strain at the end portion of the protrusion, when the rigid structure is displaced relative to the frame by the differential pressure. The peaks of strain may correspond to peaks of the tensile stress induced in the sheet. The tensile stress induced in the sheet by the displacement may have a local maximum at the end portion.

The end portion or any other end portion, which faces the frame, of the at least one protrusion may include a through hole (which may also be referred to a stress hole). Alternatively or in addition, at least some of the protrusions may include one or more corners and/or sharp tips at the end portion facing the frame. The corner, the tip and/or the hole can localize and increase the tensile stress induced by the displacement.

The sheet may be flat. The attachment surfaces may be parallel to the sheet. The rigid structure may be substantially flat. The rigid structure and the sheet may be arranged parallel to each other. The sheet may be a membrane, a foil or a laminate including one or more layers. A thickness of the rigid structure may be at least 2, 10 or 50 times greater than a thickness of the sheet.

The sheet may be made of Glass-fiber Reinforced Plastic (GRP) and/or thermoplastic material. E.g., the GRP may include a thermoplastic matrix. The sheet may include carbon fibers, aramid fibers, polyethylene fibers, glass fibers, basalt fibers, etc., or a combination thereof.

The at least one protrusion may extend in a first direction. The attachment surface towards which the protrusion protrudes (e.g., the attachment surface closest to the protrusion) may extend in a second direction perpendicular to the first direction. Mechanical properties, e.g., the elasticity and/or the ultimate tensile strength, of the sheet may have a two-fold rotational symmetry. The two-fold rotational symmetry may be aligned with at least one of the first direction and the second direction.

The sheet may include at least two layers. Each of the layers may have an anisotropic stress-strain characteristic. The ultimate tensile strength may be anisotropic in each of the layers. A maximum direction for the ultimate tensile strength of a first layer may correspond to the first direction, and a maximum direction for the ultimate tensile strength of a second layer may correspond to the second direction.

The sheet may include a 2-layer grid consolidation. E.g., the sheet may include woven fibers. The fibers may enclose a 90° angle. Weft fibers (also referred to as woof fibers) may be oriented in the first direction, and warp fibers may be oriented in the second direction perpendicular to the first direction, or vice versa.

The rigid structure may include a rectangular grid. The rectangular grid may be aligned with the first direction and the second direction. An area fraction of the grid may be equal to or less than 50%.

The sheet may rupture, when the displacement increases a distance between the at least one protrusion and the attachment surface beyond a predefined rupture distance. The sheet may rupture at one of the end portions of the protrusions, when the differential pressure acting on the side surfaces of the module exceeds the predefined critical differential pressure. Based on the elasticity of the sheet, the rupture distance may correspond to the critical differential pressure.

The at least one protrusion may be connected to the frame, e.g., to the corresponding attachment surface, via a strap. The strap may allow movement of the rigid structure relative to the frame up to a maximum distance between the protrusion and the corresponding attachment surface. The strap may transmit at least substantially no force, e.g., in the first direction, when the distance between the at least one protrusion and the attachment surface is less than the maximum distance. The maximum distance may be defined by a length of the strap.

The maximum distance may be greater than the rupture distance. The at least one strap may prevent that the rigid structure detaches from the frame after the rupture of the sheet.

For example, a rivet may be fitted in the end portion of the protrusion facing the frame. The strap may include a slit or elongated hole having a width, which is equal to or greater than a diameter of the rivet and smaller than a head of the rivet. The width may extend in the second direction. The rivet may be slidably fitted in the elongated hole, e.g., along the first direction. The length of the elongated hole may define the maximum distance. The strap may be connected to the frame at an attachment point. An end position of the rivet in the elongated hole opposite to the attachment point may define the maximum distance.

The sheet may be attached by gluing or plastic welding to at least one of the attachment surfaces of the frame and the rigid structure.

The frame may include edges, e.g., circumferential edges. Some or each of the edges may include a plurality of attachment points. Each of the attachment points may be connected or connectable to a cross beam of the supporting structure of the aircraft.

Some or each of the edges may include a zipper, or a half-component thereof, for gas-tightly connecting the module with a neighboring module that abuts against the corresponding edge.

According to another aspect, a compartment interface including a plurality of such modules is provided. The expression interface may encompass a compartment wall or a compartment ceiling.

BRIEF DESCRIPTION OF THE DRAWINGS

In the following, the disclosure is described in more detail with reference to exemplary embodiments illustrated in the drawings, wherein FIG. 1 schematically illustrates a first embodiment of a module for sealing an interface between compartments of a pressurized cabin of an aircraft;

FIG. 2 schematically illustrates crack propagation in the module of FIG. 1;

FIG. 7 schematically illustrates a longitudinal cross-section of an aircraft as a use case for the module;

FIG. 8 schematically illustrates an enlarged detail for the use case of FIG. 7;

DETAILED DESCRIPTION OF THE PREFERRED EMBODIMENTS

Figure 3:
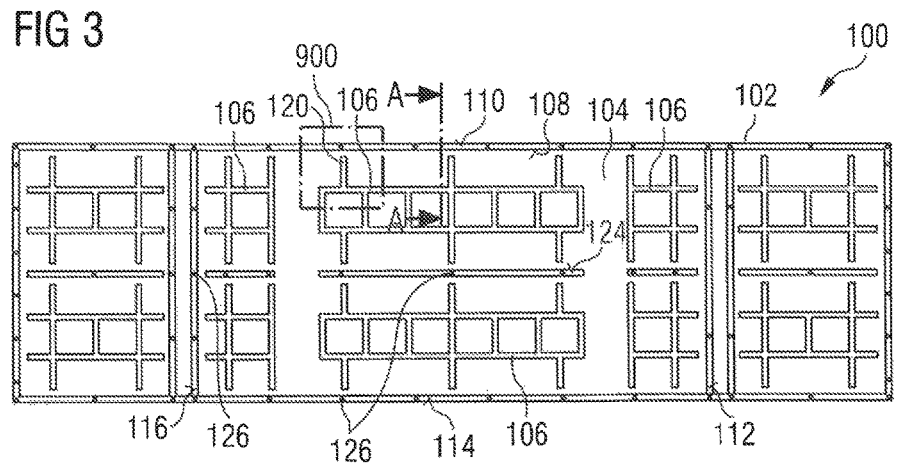
FIG. 3 schematically illustrates a backside view of a second embodiment of a module for sealing an interface between compartments of a pressurized cabin of an aircraft.

FIG. 1 schematically illustrates a backside view of a first embodiment of a module generically indicated by reference sign 100. The module 100 allows sealing an interface between compartments of a pressurized aircraft cabin. The module 100 includes a frame 102, a sheet 104 and a rigid structure 106. The frame 102 provides at least one opening 108 surrounded by an attachment surfaces 110, 112, 114 and 116. More specifically, the attachment surfaces 110 to 116 are on the opposite side of the frame 102, which are not shown in the backside view of FIG. 1. The frame 102 is connectable to a supporting structure of the aircraft.

The sheet 104 is attached to the attachment surfaces 110 to 116 in a gas-tight manner. The sheet 104 seals the opening 108 in the frame 102.

The rigid structure 106 is attached to the sheet 104 within the frame 102. The rigid structure 106 does not directly come into contact with the frame. In the first embodiment shown in FIG. 1, the rigid structure 106 is centered within the frame 102. Thus, the rigid structure 106 is supported solely by the sheet 104. Furthermore, the rigid structure 106 ruggedizes the sheet 104 in those areas that are attached to the grid structure 106. Furthermore, the rigid structure 106 avoids formation of tensile stress in the sheet 104 in unattached areas that are enclosed by the areas attached to the rigid structure 106.

In the presence of a pressure difference between the backside of the module 100 (shown in FIG. 1) and its front side (i.e., at the other surface of the sheet 104 not shown in the backside view of FIG. 1), the rigid structure 106 is displaced (which is also referred to as deflected) towards the side of lower pressure. Consequently, tensile stress is induced in the sheet 104 in the area 118 between the frame 102 and the rigid structure 106.

In the first embodiment shown in FIG. 1, the rigid structure 106 includes at least one protrusion 120 protruding from the rigid structure 106 towards the frame 102. More specifically, each of the protrusions protrudes towards a corresponding one of the attachment surfaces 110 and 114.

The induced tensile stress in the sheet is locally increased in a vicinity of an end portion 122 of the protrusion 120 facing the corresponding attachment surface 110.

FIG. 2 schematically illustrates an enlarged detail 200 including the area 118 of induced tensile stress. The sheet 104 ruptures in the area 118, when the induced tensile stress exceeds an ultimate tensile strength of the sheet 104.

By virtue of the end portion 122, a rupture of the sheet 104 is reproducibly caused in the vicinity of the end portion 122. A crack is formed at the end portion 122 and propagates typically at the speed of sound in the sheet 104.

A direction of crack propagation is predetermined by an anisotropic mechanical property of the sheet 104. For example, when an ultimate tensile strength of the sheet 104 is less in a first direction 202 than the ultimate tensile strength of the sheet 104 in a second direction 204, the crack propagates in the second direction 204 starting from the end portion 122 of maximum local tensile stress. The crack propagates to the left and to the right parallel to the corresponding attachment surface 110, as is indicated at reference sign 206. The crack propagation is terminated by the other attachment surfaces 112 and 116 extending in the first direction 202.

FIG. 3 schematically illustrates a backside view of a second embodiment of a module 100 for sealing an interface between compartments of a pressurized cabin of an aircraft. Corresponding reference signs relate to corresponding features, as described with reference to FIGS. 1 and 2.

The second embodiment includes a plurality of rigid structures 106 attached to the same sheet 104. An integral structure of the sheet 104 is illustrated in the front side view of the second embodiment of the module 100 shown in FIG. 4.

The second embodiment of the module 100 includes, in addition to the circumferential attachment surfaces 110 to 116, at least one intermediate attachment surface 124.

Figure 4:
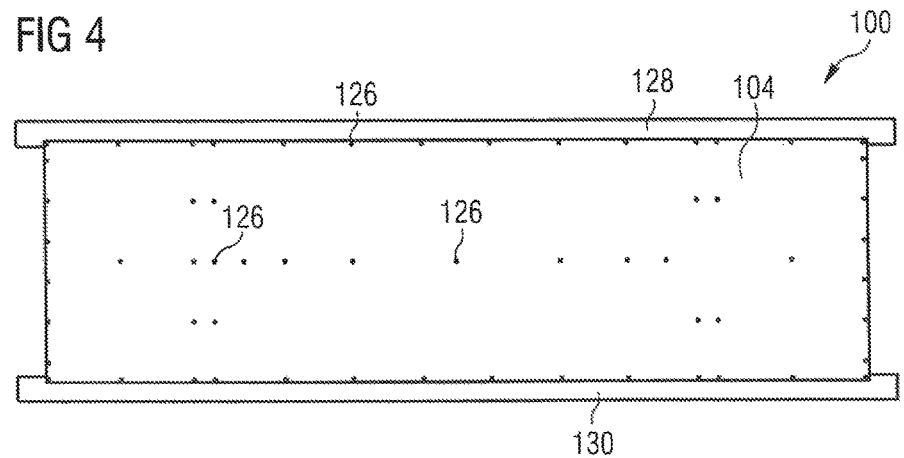
FIG. 4 schematically illustrates a front side view of the second embodiment.

The frame 102 includes a plurality of attachment points 126, some of which are indicated by reference sign 126 in FIGS. 3 and 4 for clarity. The frame 102 is connected to the supporting structure of the aircraft at the attachment points 126 by means of rivets.

The second embodiment of the module 100 further includes a male component 128 and a female component 130 of an air-tight zipper at opposite edges of the frame 102. In an exemplary use case of the module 100, two or more of the modules are coupled by means of the zippers 128 and 130 forming an advanced cargo-lining module. In this context, the module 104 may also be referred to as a sub-module of the advanced module.

The sheet 104 is a barrier that hinders air exchange between neighboring compartments, e.g., a cargo compartment and a passenger compartment. The sheet 104 is also referred to as a skin sheet or a face sheet. The sheet 104 includes a thin laminate, e.g., 0.10 mm to 1.00 mm (e.g., about 0.50 mm), in thickness. The laminate is made of a glass-fiber reinforced thermoplastic, e.g., polyetherimide (PEI), polycarbonate (PC), polyamide or others.

The anisotropic material property of the sheet 104 is created in a consolidation process of two or more layers. A surface structure of the sheet resulting from the consolidation process may have a lattice or grid structure, which is why the process is also referred to as a grid consolidation process. For instance, a regular pressure field with regions of higher pressure and lower pressure is applied to the sheet 104 in the consolidation process. For example, a grooved surface is created on the sheet 104 with different grooves in different directions, e.g., in the first direction 202 and the second direction 204. Exemplary surface structures or patterns for the sheet 104 include a honeycomb structure, dots, lines, etc.

The laminate resulting from the consolidation process thus includes a texture and anisotropic mechanical properties. In particular, a rupture behavior due to tensile stress in the plane of the sheet 104 (e.g., by tearing) is anisotropic. Typically, regions or lines with relatively high shear coupling (e.g., as a result of higher pressure applied in the consolidation process) between the individual layers have a lower ultimate tensile strength than regions or lines with relatively low shear coupling (e.g., caused by higher pressure applied in the consolidation process).

Figure 5:
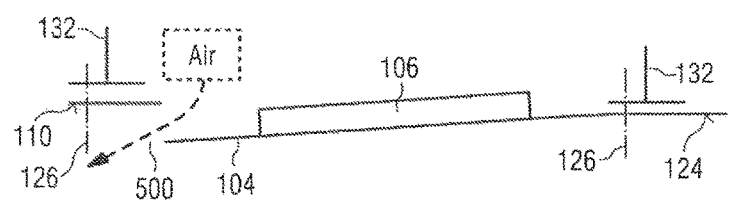
FIG. 5 schematically illustrates a decompression functionality in a blow-in situation of the module of FIGS. 1 and 2 or FIGS. 3 and 4.
Figure 6:
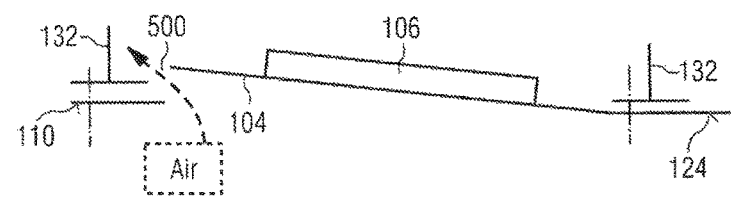
FIG. 6 schematically illustrates a decompression functionality in a blow-out situation of the module.

FIGS. 5 and 6 schematically illustrate a rapid decompression functionality of the module 100 along the cross-section A-A indicated in each of the FIGS. 1 to 3. Corresponding reference signs indicate corresponding features, as introduced with reference to FIGS. 1 to 4 above. The cross-section A-A in FIGS. 5 and 6 further illustrates a cross-beamer 132 located on the backside, as an example for the supporting structure.

The first and second embodiments of the module 100 provide at least two possible crack lines 206, each of which is configured to open a ventilation passage 500. FIGS. 5 and 6 illustrate the rupture at one of the possible crack lines 206 for a blow-in situation and for a blow-out situation, respectively. The crack line 206 is perpendicular to the plane of the drawing sheet of FIGS. 5 and 6.

As an exemplary requirement, rupture of the sheet 104 has to occur for equalizing a pressure difference in the blow-in situation for a critical differential pressure equal to or lower than 30 hPa, and in the blow-out situation for a critical differential pressure equal to or lower than 90 hPa.

FIG. 7 schematically illustrates a longitudinal cross-section of an aircraft 700 for an exemplary use case of the modules 100. A center region of the module 100 (including the rigid structures shown at reference sign 106 in FIG. 3) forms a compartment ceiling and a compartment wall, when installed at interfaces 702 and 704, respectively. The interface 702 is arranged between a passenger compartment 706 and a cargo compartment 708. More specifically, the compartments 708 are Lower Deck Cargo Compartments (LDCC).

FIG. 8 shows an enlarged detail 800 of an interface in the ceiling 802 of the cargo compartment 708. While the requirements for the maximum of the critical differential pressure may be different for the blow-in case and the blow-out case (such as 30 hPa and 90 hPa, respectively), the module 100 is preferably configured for a substantially equal critical differential pressure in both the blow-in case and the blow-out case. The critical differential pressure is, e.g., 30 hPa, which is equal to or less than the minimum of the required maxima for the critical differential pressure in blow-in case and blow-out case.

Figure 9:
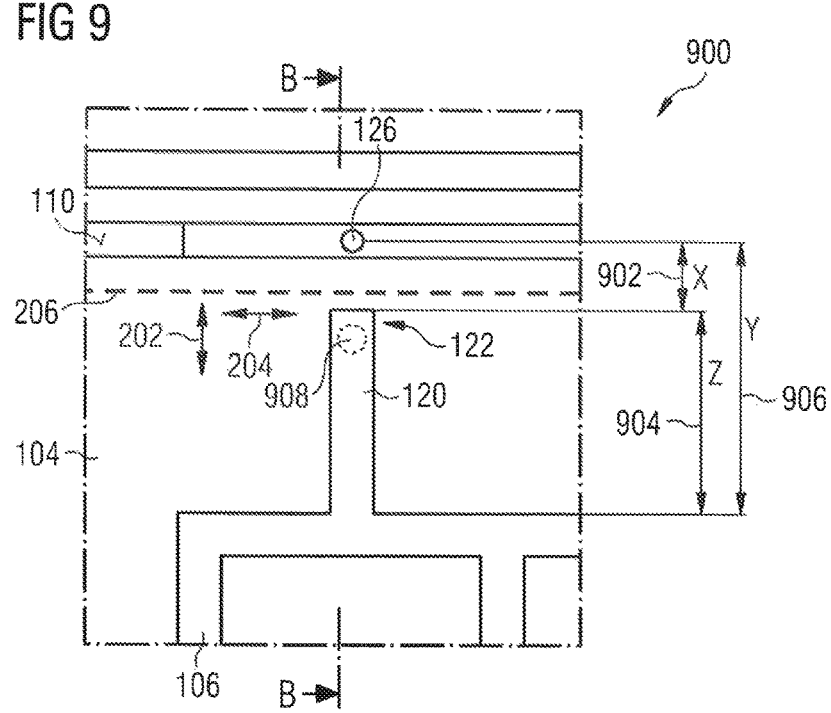
FIG. 9 schematically illustrates length dimensions in pressure equilibrium for the second embodiment.

An exemplary rupture mechanism for a reproducible critical differential pressure is described with reference to FIGS. 9 to 11. The controlled formation of the crack 206 is triggered by the tensile stress induced in the sheet 104. Due to the anisotropic geometry of the rigid structure 106, a minimum distance X (shown at reference sign 902) is predefined. The minimum distance 902 represents a free distance between the attachment point 126 and the end portion 122 of the protrusion 120 of the rigid structure 106.

A lateral dimension Z (shown at reference sign 904) of the protrusion 120 can be regarded as rigid due to material and/or thickness of the rigid structure 106. The rigid structure 106 is made of, e.g., Carbon-Fiber Reinforced Plastic (CFRP). The thickness of the rigid structure is, e.g., about 1 mm. The rigidity of the protrusion 120 prevents any remarkable elongation of the sheet 104 attached to the rigid structure 106 including the protrusion 120.

A length Y (shown at reference sign 906) represents the free distance between the attachment point 126 and a side of the rigid structure 106.

The sheet 104 is attached to the rigid structure 106 by plastic welding. Due to the attachment of the rigid structure 106 to the sheet 104, the compound of rigid structure 106 and sheet 104 has a (laterally) discontinuous elasticity. Even in the presence of a laterally uniform differential pressure, there are different levels of strain inside the sheet 104. The sheet 104 is more elastic (i.e., has a lower elastic modulus) than the rigid structure 106. The attachment between sheet 104 and rigid structure 106 causes a stiff shear coupling, as is schematically illustrated in the cross-section B-B shown in FIG. 10. Elongated lengths X* and Y* are indicated by a star-symbol for the equilibrium lengths X and Y, respectively.

Figure 10:
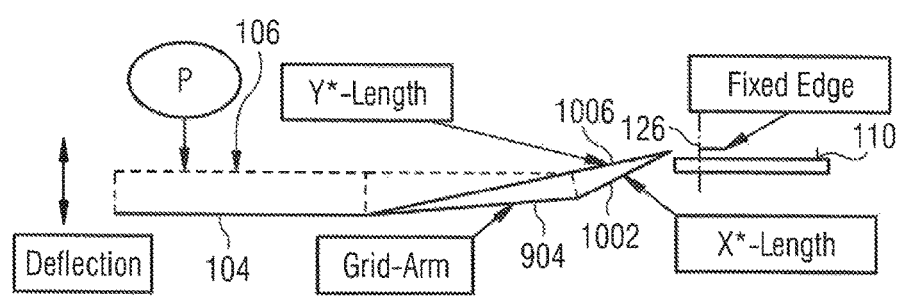
FIG. 10 schematically illustrates length dimensions in the presence of a pressure difference.
Figure 11:
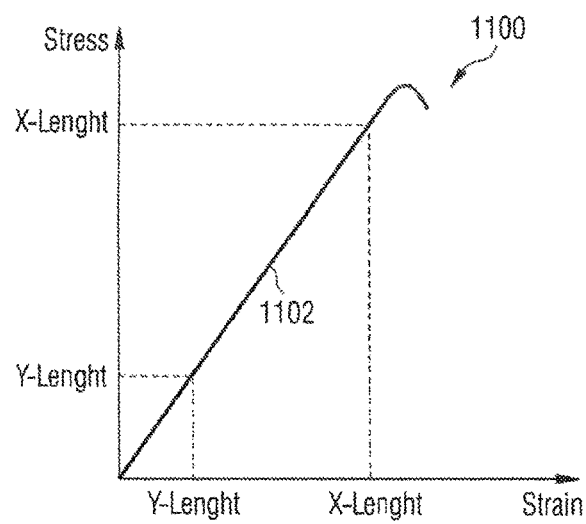
FIG. 11 shows a diagram for a schematic stress-strain characteristic of a sheet included in the module.

The situation schematically illustrated in FIG. 10 applies for a deflection of the rigid structure 106 until the length X* (shown at reference sign 1002) reaches a rupture distance Xcrit. The length X* is related to the percentage of strain that is coupled to the induced stress according to the elastic modules of the sheet 104. The lengths X* and Y* can be computed using the Pythagorean theorem. Evidently, the percentage of strain is larger for the length X* at reference sign 1002 than for the length Y* at reference sign 1006, for which reason the local tensile stress induced in the sheet 104 is (laterally) non-uniform, as is indicated by means of the stress-strain characteristic 1102, schematically illustrated in the diagram 1100 in FIG. 11. More specifically, the induced tensile stress in the first direction 202 is not constant with respect to the second direction but has a sharp maximum at the end portion 122.

In the approximation according to the schematic cross-section in FIG. 10, the ratio of the tensile stress between a path at reference sign 1002 and a path at reference sign 1006 is determined by the ratio between the lengths X* and Y*. In the first and second embodiment schematically illustrated in FIGS. 2 and 9, respectively, the length ratio Y*:X* is approximately 4:1, so that the level of tensile stress (and the corresponding level of strain) in the path at reference sign 1002 is about 4 times greater than the level of tensile stress in the path at reference sign 1006. Thus, the protruding geometry of the rigid structure 106 causes a first stress amplification.

Peel forces in the connection between the sheet 104 and the rigid structure 106 including the protrusion 120 are not relevant, because there are substantially only pressure forces and interlaminar shear forces.

The amplified shear forces in the vicinity of the end portion 122 are relatively large due to a drop in stiffness (as a function of the first direction 202). The local peak in the shear force at the end portion 122 can cause rupture of the attachment (also referred to as interlaminar connection) between the protrusion 120 and the sheet 104.

Optionally, a through hole 908 (also referred to as a stress hole) in the end portion 122 acts as a second stress amplification in the desired region for starting the crack formation. A rivet may be fitted in the hole 908. The hole 908 fixes the location of the initial crack formation, which improves the reproducibility of the critical differential pressure. The hole 908 may further prevent the rupture of the welding connection between sheet 104 and the protrusion 120 (also referred to as delamination). Typical stress amplification ratios achieved by means of the hole 908 are equal to or greater than 3 depending on the geometry of the hole 908.

Predetermining the critical differential pressure by the geometry of the rigid structure 106 and the ultimate tensile strength of the sheet 104 is explained by means of an example. The sheet 104 is reinforced by fabric sheets and preimpregnated fibers from electric glass (E-glass) and includes a non-reactive thermoplastic PEI matrix. The thickness of the sheet 104 is about 0.25 mm. The ultimate tensile strength is anisotropic with 320 MPa being the minim in the weft direction 202. The critical differential pressure (P) is 3000 Pa=30 hPa acting on an area of the sheet 104 of 0.25 m$^2$ with a quadratic shape of 0.5 m×0.5 m. A critical deflection of the rigid structure under load is 10 mm (per definition of the construction) in a direction perpendicular to the drawing sheet of FIGS. 1 to 4.

The geometry of the rigid structure 106 includes the length X=50 mm and the length Y=200 mm (without load, i.e., under pressure equilibrium). The protrusion 120 (which is also referred to as a grid arm) rotates in the plane of the drawing sheets of FIGS. 5, 6 and 10 under load, so that half of the critical deflection, i.e. 5 mm, is the deflection reached (per definition of the construction) at the end portion 122 of the protrusion 120.

The full length of the edges 110 to 116 is fixed but rotatable at the corners joining the edges. The interlaminar strength, i.e., the ultimate strength of the welding connection between attachment surfaces 110 to 116 and the sheet 104 is 50 MPa (corresponding to a welding factor 0.5).

A calculation of the elongated lengths under critical load (which leads to half of the critical deflection, i.e., 5 mm) yields that the length Y* (which is the elongation of the length Y under the critical differential pressure P) is about 200.2 mm. The length X* (which is the elongation of the length X under the critical differential pressure P) is about 50.3 mm. Hence, the Y*-length strain is 0.1% and the X*-length strain is 0.5%. The elastic modulus of the sheet 104 is 19 GPa, so that the tensile stress induced under the critical load is about 24 MPa along the Y*-path and the tensile stress induced along the X*-path is about 96 MPa.

Above numerical example has an inverse ratio X*:Y* equal to approximately 4 and no delamination occurs by virtue of the second amplification brought about by the hole 908 (including the rivet fitted therein).

By virtue of the stress hole 908 (i.e., the second stress amplification), the induced tensile stress is locally increased such that the sheet 104 ruptures along the crack 206. In above numerical example, the stress hole 908 is necessary to raise the local tensile stress in the sheet 104 by a factor 3.5, so that a (locally defined) ratio between ultimate tensile strength and induced tensile stress (which ratio is also referred to as a security factor) is less than 1. More specifically, a maximum of the tensile stress is created at a flange of the hole 908. The crack 206 starts propagating from the point of maximum stress. The crack propagates until a crack stopper is reached, e.g., another hole or a line of reinforcement.

For the geometry of the second embodiment of the module 100, it follows from the considerations with reference to FIG. 10 as to the inhomogeneous strain and the crack propagation that the critical differential pressure of the blow out event is similar to the critical differential pressure of the blow in event. Hence, controlled crack formation occurs in the blow out direction at the same pressure load (e.g., 30 hPa) as for the blow in direction.

The rapid decompression functionality poses an upper limit on the critical differential pressure. Lowering the blow out critical differential pressure, e.g., from conventionally 90 hPa to 30 hPa, does not violate a maximum critical differential pressure (e.g., of 90 hPa) required for the rapid decompression functionality.

Flight load requirements pose a lower limit on the critical differential pressure in the blow out direction, e.g., for retaining cargo that may impact on the module 100 (e.g., the sheet 104) in the blow out direction. Below table provides numerical examples for flight load requirements at different interfaces.

| | Cargo density [lbs/ft$^3$] | Ultimate load factor | Ultimate load 100% [lbs/ft$^2$] | 65% [lbs/ft$^2$] | [N/mm$^2$] | Remarks |
|---|---|---|---|---|---|---|
| Sidewall/partition bulk only | 15 | 2.15 | 278 | 181 | 0.0087 | A320 |
| Ceiling bulk only | 15 | 4.26 | 261 | 169 | 0.0081 | A320 |
| Sidewall/partition occ. bulk | 10 | 1.85 | 160 | 104 | 0.0050 | A321neo |
| Ceiling occ. bulk | 10 | 3.53 | 144 | 94 | 0.0045 | A320 |

When bulk cargo is loaded in the LDCC 708, the ceiling 702, the sidewalls 704 and partitions of the cargo compartment lining have to be configured to take the loads applied due to the mass of the bulk cargo under flight acceleration. According to the second line in the penultimate column of above exemplary table, the minimum flight load required for the LDCC 708 is 81 hPa for bulk cargo loads.

Figure 12:
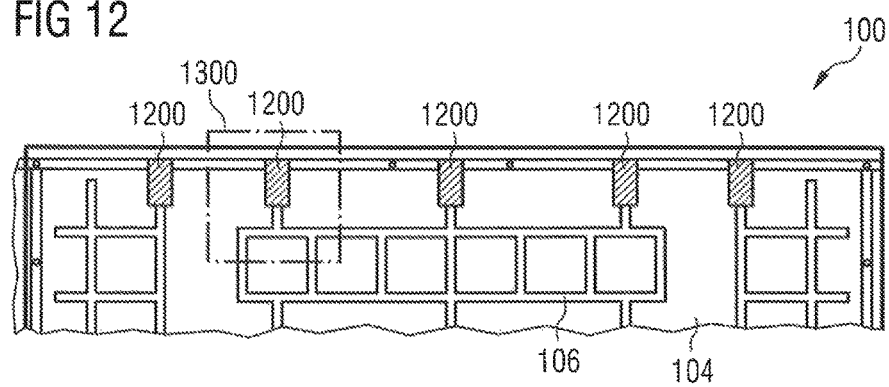
FIG. 12 schematically illustrates a backside view of a variant of the second embodiment of the module.

Since this lower limit is not fulfilled by the second embodiment as described above, the second embodiment is extended. The extended second embodiment of the module 100 further includes one or more straps 1200 shown in FIG. 12. The straps 1200 are coupled to both the frame 102 and the grid structure 106. The strap 1200 exerts essentially no force as long as the distance X* is less than a maximum distance $X_{max}$. A movement of the rigid structure 106 is limited in the variant, so that the length X* is limited to the maximum length $X_{max}$. The strap 1200 is a piece of sheet metal or laminate.

Figure 13:
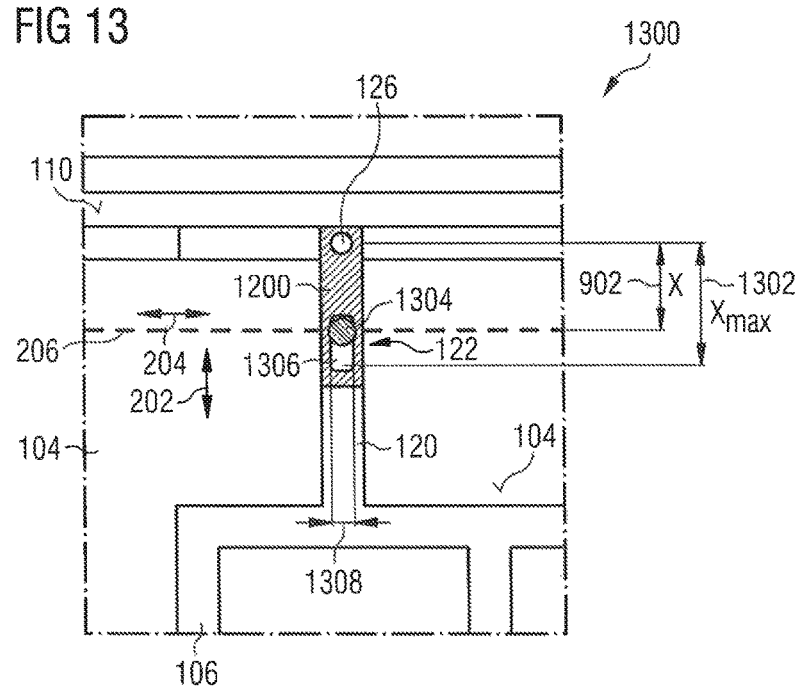
FIG. 13 shows an enlarged detail of the variant of FIG. 12.

FIG. 13 schematically illustrates an enlarged detail 1300 of the module 100 according to the extended second embodiment. The maximum distance is indicted at reference sign 1302. At pressure equilibrium, the distance between protrusion 120 (e.g., the end portion 122) and the frame 102 (e.g., the attachment point) is X, as is illustrated at reference sign 902.

A rivet 1304 is arranged in the stress hole 908 of the rigid structure 106. The strap 1200 includes an elongated hole 1306. The rivet 1304 is slidably arranged in the elongated hole 1304. A diameter of a shaft of the rivet 1304 is less than the width W of the elongated hole 1304 indicated at reference sign 1308. A head of the rivet 1304 is large enough to positively lock the rivet 1304 in the elongated hole 1306.

In the rapid decompression event, the sheet 104 rupture when X* exceeds the critical distance $X_{crit}$. The distance X* continues to increase until the larger maximum distance $X_{max}$ is reached, which is defined by the strap 1200 and the rivet 1304 being positioned at the end of the elongated hole 1306 opposite to the attachment point 126. The strap 1200 thus defines an opening gap for the air passage 500. Furthermore, the strap provides the tensile strength to meet the flight load requirements.

As has become apparent from the above description of exemplary embodiments, at least some of the embodiments provide at cost-efficient and low-weight decompression functionality. The technique can avoid systems including flaps. At least some embodiments provide the decompression functionality for both the blow-in case and the blow-out case.

The technique is readily implemented to fulfill burn-through resistance requirements and/or to fulfill specified mechanical load cases. Furthermore, the technique is compatible with existing cargo environments. E.g., a clearance required for the movement of the rigid structure can be reduced compared to the clearance required by conventional decompression systems.

At least some implementations of the modules use zippers as air-tight connections between lining panels. Due to the modular structure, the technique is robust and easily repairable. Same or other implementations of the modules are compatible with thermoplastic laminates that can be textured and/or consolidated according to a pattern structure.

In the forgoing, principles, preferred embodiments and various modes of implementing the technique disclosed herein have been exemplarily described. However, the present invention should not be construed as being limited to the particular principles embodiments in modes discussed above. Rather, it will be appreciated that variations and modifications may be made by a person skilled in the art without departing from the scope of the present invention as defined in the following claims.

The invention claimed is:

1. A module for sealing an interface between compartments of a pressurized cabin of an aircraft, the module comprising:
a frame providing at least one opening surrounded by attachment surfaces, the frame being connected or connectable to a supporting structure of the aircraft;
a sheet attached to the attachment surfaces of the frame for sealing the at least one opening; and
a rigid structure attached to the sheet within the frame without contacting the frame so that a displacement of the rigid structure relative to the frame induces tensile stress in the sheet between the frame and the rigid structure,
wherein the rigid structure includes at least one protrusion connected to the frame via a strap that transmits at least substantially no force in a first direction when a distance between the at least one protrusion and the attachment surface is less than a maximum distance defined by a length of the strap,
wherein the sheet is configured to rupture due to the induced tensile stress, when a pressure difference between the compartments acts on the module and exceeds a critical value and when the displacement increases a distance between the at least one protrusion and the attachment surface beyond a predefined rupture distance.

2. The module of claim 1, wherein each protrusion of the at least one protrusion protrudes towards one of the attachment surfaces of the frame without contacting the frame.

3. The module of claim 2, wherein each of the at least one protrusion defines a minimum distance between the rigid structure and the attachment surface towards which it protrudes.

4. The module of claim 3, wherein a lateral dimension of the protrusion is at least twice the minimum distance.

5. The module of claim 2, wherein an elastic modulus of the rigid structure is greater than an elastic modulus of the sheet, so that the displacement of the rigid structure relative to the frame induces the tensile stress in the sheet at an end portion of the protrusion facing the frame.

6. The module of claim 5, wherein a hole is formed in the end portion of the protrusion.

7. The module of claim 2, wherein the at least one protrusion extends in the first direction and the attachment surface towards which it protrudes extends in a second direction perpendicular to the first direction.

8. The module of claim 7, wherein mechanical properties of the sheet have a two-fold rotational symmetry that is aligned with at least one of the first direction and the second direction.

9. The module of claim 7, wherein the rigid structure includes a rectangular grid that is aligned with the first direction and the second direction.

10. The module of claim 1, wherein the maximum distance is greater than the rupture distance.

11. The module of claim 1, wherein a rivet is fitted in an end portion of the protrusion facing the frame, and wherein the strap includes an elongated hole having a width in the second direction, which is equal to or greater than a diameter of a shaft of the rivet and smaller than a diameter of a head of the rivet, so that the rivet is arranged in the elongated hole slidably in the first direction.

12. The module of claim 1, wherein the sheet is attached by plastic welding to at least one of the attachment surfaces of the frame and the rigid structure.

13. The module of claim 1, wherein the frame includes a plurality of attachment points, each of which is connected or connectable to the supporting structure of the aircraft.

* * * * *